(12) United States Patent
Elend

(10) Patent No.: US 10,615,957 B2
(45) Date of Patent: Apr. 7, 2020

(54) COMMUNICATIONS DEVICE WITH ADAPTIVE CLOCK FREQUENCY

(75) Inventor: Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 222 days.

(21) Appl. No.: 13/273,150

(22) Filed: Oct. 13, 2011

(65) Prior Publication Data

US 2012/0093268 A1 Apr. 19, 2012

(30) Foreign Application Priority Data

Oct. 14, 2010 (EP) .................................. 10187601

(51) Int. Cl.
*H04L 7/04* (2006.01)

(52) U.S. Cl.
CPC .................................... *H04L 7/048* (2013.01)

(58) Field of Classification Search
CPC .................................. H03L 7/08; H04L 7/048
USPC ............... 375/316, 372, 373, 374, 375, 376
See application file for complete search history.

(56) References Cited

U.S. PATENT DOCUMENTS

| 5,084,685 A * | 1/1992 | Moller et al. ................ 331/1 A |
| 5,369,377 A * | 11/1994 | Benhamida .................... 331/49 |
| 6,285,264 B1 * | 9/2001 | Mann ............................ 331/158 |
| 6,747,522 B2 * | 6/2004 | Pietruszynski et al. .. 331/177 R |
| 7,639,092 B2 * | 12/2009 | Shen et al. .................. 331/36 C |
| 7,716,765 B1 | 5/2010 | Lakov |
| 2005/0147197 A1 * | 7/2005 | Perrott ........................ 375/376 |
| 2007/0061665 A1 * | 3/2007 | Cranford et al. ............. 714/752 |

FOREIGN PATENT DOCUMENTS

| EP | 0 428 774 B1 | 9/1994 |
| EP | 1 231 748 B1 | 10/2004 |
| WO | 2008/006613 A1 | 1/2008 |

OTHER PUBLICATIONS

Extended Search Report for Patent Appln. No. 10187601.9 (dated Feb. 28, 2011).

* cited by examiner

*Primary Examiner* — Jaison Joseph
(74) *Attorney, Agent, or Firm* — Rajeev Madnawat

(57) ABSTRACT

The invention provides a communications device which uses a clock circuit for generating a clock signal, the clock circuit comprising a tuneable oscillator. The clock frequency is varied to make sure it remains within a tolerance range, so that the device can continue to receive messages correctly. An error rate of received messages is determined, and in response to the error rate exceeding a threshold, a setting of the resistor arrangement and/or the capacitor arrangement is changed to change the clock signal frequency thereby to lower the error rate.

14 Claims, 3 Drawing Sheets

COMMUNICATIONS DEVICE WITH ADAPTIVE CLOCK FREQUENCY

This application claims the priority under 35 U.S.C. § 119 of European patent application no. 10187601.9 filed on Oct. 14, 2010, the contents of which are incorporated by reference herein.

FIELD OF THE INVENTION

The present invention relates generally to communications devices which have internal clock circuits, used when sending and receiving messages. In particular, the invention relates to devices using an on-chip RC oscillator, and control of the RC oscillator to compensate for temperature and supply voltage variation of the oscillation.

BACKGROUND OF THE INVENTION

Microcontrollers are found in wide variety of products, such as electronic consumer devices and household appliances. A microcontroller should be clocked by a stable and accurate oscillating signal.

One method of generating a stable and accurate clock signal is to use a phase-locked loop (PLL) that receives an accurate reference signal from an external crystal oscillator. Manufacturing costs can be reduced, however, by generating the clock signal using an internal, on-chip oscillator as opposed to a more expensive external crystal oscillator.

An internal precision oscillator in a microcontroller can be an RC oscillator. A capacitor of the RC circuit is charged and discharged after the voltage across the capacitor reaches a lower and upper trigger voltage, respectively. The rate at which the capacitor is charged and discharged depends on the RC time constant of the RC circuit. The output frequency can be tuned by controlling either the capacitance of the capacitor and/or the resistance of the resistor in the RC circuit.

One way to perform this tuning is by means of digital control. A number in a register determines a set of capacitors that are switched in parallel, or a resistor configuration that has resistors in series, individual ones of which can be selectively short circuited.

At the end of production of a device, the oscillator is trimmed close to its target frequency by writing an appropriate number into the register. However, even though the frequency of the oscillator might meet the required target frequency perfectly after programming the register, the frequency might change over temperature and leave the allowed tolerance range.

In many applications, a microcontroller experiences a wide variation in its operating temperature. Temperature variation can affect the frequency of the clock signal output by the RC oscillator, and that clock signal may become insufficiently stable and not sufficiently accurate for the particular application. For example, the RC oscillator resistor resistance may change with temperature, i.e., the resistor has a positive or negative temperature coefficient. A change in resistance may affect not only the RC time constant, but also the trigger voltages at which the capacitor is charged and discharged.

In one example, an on-chip oscillator is desired that is capable to clock a CAN (controller area network) controller block. Such CAN controllers require that the clock frequency does not deviate more than a fixed percentage from its nominal frequency. The deviation value depends on the details of the bit-timing parameters, but in any case it is less than 2%, in some cases even less than 1%. Since no external clock reference is available, there is currently no design available that meets this requirement over an ambient temperature range from −40° C. up to +125° C.

One method of compensating for resistance changes caused by temperature variation in RC oscillators relies on matching resistors with positive temperature coefficients to resistors having negative temperature coefficients. Transistors and resistors may also be matched in a similar way to provide insensitivity to temperature variations. It can be difficult, however, to manufacture an on-chip resistor/transistor whose temperature coefficient inversely matches that of its paired resistor/transistor over the entire operating temperature range.

U.S. Pat. No. 7,176,765 discloses an implementation of temperature compensation by controlling a comparator bias current.

These known measures either require additional circuitry, such as temperature sensors and variable circuit elements, or they require components with very specific response characteristics to temperature, which may be difficult to manufacture.

SUMMARY OF THE INVENTION

According to the invention, there is provided a communications device, comprising:
a clock circuit for generating a clock signal, and comprising an on-chip circuit which defines a time constant which governs the oscillator frequency, wherein the frequency is tuneable;
a receiver for receiving messages using the clock signal;
a controller adapted to:
determine an error rate of received messages; and
in response to an error rate exceeding a threshold, vary the clock signal frequency thereby to lower the error rate.

This device monitors errors in received messages as an indication that a clock frequency is outside a tolerance range. In response, the oscillator circuit is re-trimmed to vary the frequency. An iterative trial and error process can be carried out to find a new frequency within the tolerance range, as indicated by a drop in the error rate.

The clock circuit can comprise an RC oscillator circuit comprising a resistor arrangement and a capacitor arrangement which together define an RC time constant, wherein at least one of the resistor arrangement and capacitor arrangement is tuneable.

The controller is then adapted to vary a setting of the resistor arrangement and/or the capacitor arrangement to change the clock signal frequency.

The receiver can be adapted to receive frames of data messages, and the controller is adapted to determine a number of received messages based on initial activity on the message carrier (such as a bus) indicating the presence of data frames, and to determine a number of frames not correctly received.

The initial activity can be detected even if the clock frequency is incorrect, in that changes in bit value are detected. An error is detected if the bits received do not match the protocol used to package the bits, or if error checking mechanisms built into the protocol indicate an error in reception.

In one example, the receiver is a CAN bus receiver, and the initial activity comprises a start-of-frame bit.

Thus, the invention provides a method for frequency correction, for example to correct for temperature- or supply voltage dependent changes in frequency, within a CAN system, and in a way that avoids the need for temperature measurement.

The controller can be adapted to:

a) vary the frequency by an amount in one sense, in response to the error rate exceeding the threshold, b) if the error rate remains exceeding the threshold, vary the frequency by a greater amount in the opposite sense to the preceding variation, wherein step b) is repeated if the error rate remains exceeding the threshold.

This provides an iterative process, by which the frequency is moved further and further away from the starting point, and both above and below the starting frequency in alternation. Other iterative processes can be employed, which essentially scan the frequency spectrum in the vicinity of the starting frequency.

The difference in frequency after two successive frequency variations is smaller than the specified tolerance width of the frequency range for the communications device. This means that one of the iterative steps will inevitably result in the frequency falling within the tolerance range.

In the case of an RC oscillator, the resistor arrangement can be fixed and the capacitor arrangement tuneable, so that the RC constant is varied by digitally trimming the capacitor arrangement to vary the clock frequency.

In a CAN system, there is also the possibility to derive some information from the correctly received frames. If all re-synchronizations where done by lengthening Phase 1 (as shown in FIG. 3), the frequency is too high. If all re-synchronisation steps are implemented by shortening Phase 2, then the frequency is too low.

Thus, the frequency can be controlled in a way that takes account of this additional information derived from frames which have been received correctly.

The invention also provides a method of controlling the output frequency of a clock circuit of a communications device, the clock circuit comprising an on-chip oscillator circuit which defines a time constant which governs the oscillator frequency, wherein the frequency is tuneable;

wherein the method comprises:

receiving messages using the clock signal;

determining an error rate of received messages; and in response to an error rate exceeding a threshold, varying the clock signal frequency thereby to lower the error rate.

The method of the invention can be implemented by a computer program which operates a controller of the device.

BRIEF DESCRIPTION OF THE DRAWINGS

The invention will now be described with reference to the accompanying drawings, in which.

DETAILED DESCRIPTION OF EMBODIMENTS

The invention provides a communications device which uses a clock circuit for generating a clock signal, the clock circuit comprising a tuneable on-chip oscillator circuit, for example comprising a resistor arrangement and a capacitor arrangement which together define an RC time constant which governs the oscillator frequency. The clock frequency is tuneable, for example at least one of the resistor arrangement and capacitor arrangement is tuneable.

The clock frequency is varied to make sure it remains within (or evolves to) a tolerance range, so that the device can continue to receive messages correctly. An error rate of received messages is determined, and in response to the error rate exceeding a threshold, the clock frequency is adjusted. For example, a setting of the resistor arrangement and/or the capacitor arrangement is changed to change the clock signal frequency thereby to lower the error rate.

The implementation of the invention firstly requires an oscillator which can be tuned, preferably digitally, during operation, and secondly requires a communications system in which receive errors which result from frequency drift of the clock signal can be detected (by the device which itself is suffering the frequency drift).

There are various different types of oscillator which can be used in the device of the invention.

Figure 1:
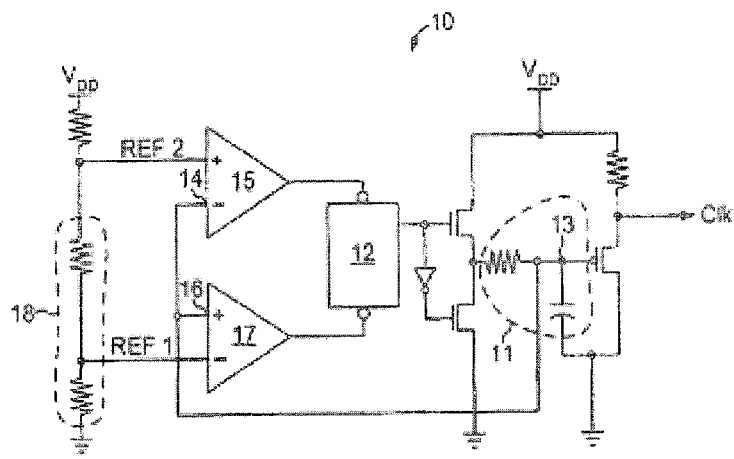
FIG. 1 shows a known RC oscillator.

One example of RC oscillator is shown in FIG. 1, and is described in U.S. Pat. No. 7,176,765. However, LC oscillators may also be used.

The oscillator 10 has an RC circuit 11, and an RS latch 12 for switching between the output of two comparators 15, 17. An RC node 13 is coupled to an inverting input lead 14 of a discharge comparator 15 and to a non-inverting input lead 16 of a charge comparator 17.

Charge comparator 17 detects when the voltage on RC node 13 reaches a lower reference voltage, at which time RS latch 12 causes charge to accumulate on RC node 13. Discharge comparator 15 detects when the voltage on RC node 13 reaches a higher reference voltage, at which time RS latch 12 causes charge to discharge from RC node 13. The reference voltages are generated by a voltage divider 18 formed by a resistor string.

As the operating temperature of oscillator 10 changes, the resistance of the resistors in the resistor string change, thereby changing the reference voltages.

Other designs of RC oscillator do not use comparators in this way. For example, the resistor can be part of a current generator circuit, which determines the rate at which the capacitor is charged. When the capacitor is charged to a given voltage (sufficient to latch the output of a logic device), a shorting transistor is operated to discharge the capacitor. In this way, there is only one reference voltage level.

Other RC oscillator circuit will be known to those skilled in the art. The invention applies equally to all such designs as well as other tuneable oscillators.

Figure 2:
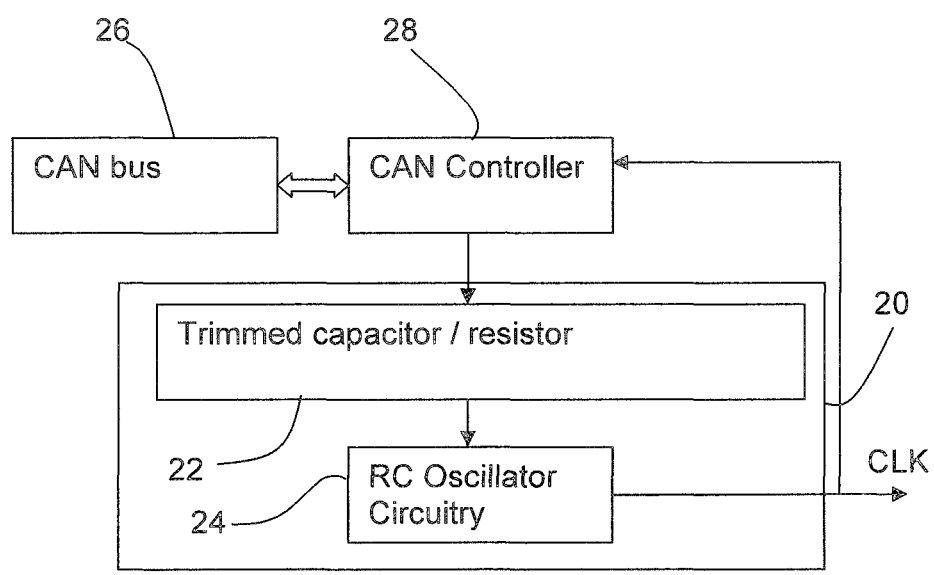
FIG. 2 shows an oscillator design which can be used in the device of the invention.

FIG. 2 shows a device of the invention in the form of a communications device having an RC oscillator 20 which generates a clock signal CLK, which is used by a protocol controller 28 for the reception (and optionally also transmission) of data messages. The example of FIG. 2 is for a CAN system. The protocol controller 28 incorporates the message receiver for the CAN system.

The RC oscillator 20 can be of any suitable known design, providing it has a digitally tuneable capacitor or resistor arrangement 22 as well as the other oscillator circuitry 24.

A tuneable resistor arrangement can comprise a string of resistors in series, with a respective shorting transistor in parallel with each resistor in the string (or only a sub-set of the resistors may need to be shortable). The gate voltages of the shorting transistors are controlled so that they function as binary switches.

A tuneable capacitor arrangement can comprise an array of capacitors in parallel, with a respective transistor in series with each capacitor in the array (or only a sub-set of the capacitors may need to be switchable into circuit). The gate voltages of the shorting transistors are controlled so that they again function as binary switches.

The trimmable capacitor or resistor arrangement is shown schematically as 22.

The CAN controller 28 applies a trimming setting to the resistor arrangement and/or the capacitor arrangement as determined by the method described below. The CAN controller, also receives messages from (and optionally also sends messages to) a CAN bus 26.

The invention relates specifically to communications devices which use a local oscillator as a clock generator, and then use the clock signal for timing during reception of messages. If the clock signal drifts too far from the designed value, the reception of messages gives rise to errors.

The communications device needs to be able to detect messages, even if they cannot be received without error, and needs to be able to distinguish between messages that have been received without error and those that have been received with errors.

As mentioned above, FIG. 2 shows the invention applied to a controller area network (CAN). This is a vehicle bus standard which allows devices and controllers to communicate with each other. The devices require their own clocks, and there is a small tolerance of permitted clock frequency variation.

The CAN system uses an automatic arbitration method, based on the use of dominant and recessive bits.

Synchronization is done by dividing each bit of the frame into a number of segments: Synchronization, Propagation, Phase 1 and Phase 2. The length of each phase segment can be adjusted based on network and node conditions The Synchronization segment is fixed to 1 time quanta, the propagation segment is configured to a fixed length, and Phases 1 and 2 are adjusted by a re-synchronization process. The bit sampling point falls between Phase Segment 1 and Phase Segment 2, which helps facilitate continuous synchronization. Continuous synchronization in turn enables the receiver to be able to properly read the messages.

Figure 3:
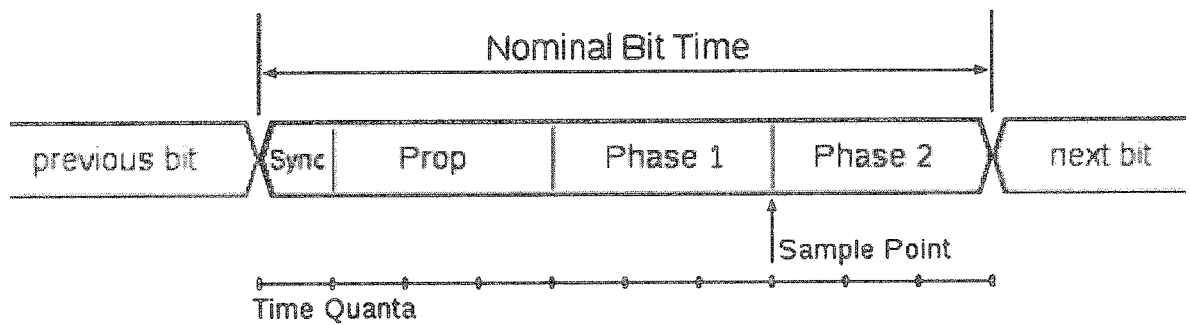
FIG. 3 shows the CAN bit timing, known from ISO11898-1.

FIG. 3 is a diagram showing the CAN Bit Timing.

The invention uses the controller to obtain information as to whether there is communication on the bus or not. If there is communication on the bus, but nothing is received, then there are errors. This logic applies independently of the protocol/physical layer used, so that the principles underlying the invention can also applied to other communication systems than CAN.

In accordance with the invention when applied to a CAN system, the CAN receiver receives messages using the clock signal. An error rate of received messages is determined and if the error rate exceeds a threshold, the clock signal frequency is iteratively adjusted.

The receiver performs oversampling, and this is the case for many protocols, such as CAN, FlexRay and Ethernet. At some points in time, the samples will show activity on the bus and immediately any communication controller will interpret this as the start-of frame and try to decode the message. The oversampling means that activity will be detected even if the clock frequency is incorrect. The controller may of course fail to decode the message due to wrong clock frequency.

The decoder will for example find that the frame format does not fit, the stuffing rules are not met, or that the cyclic redundancy check (CRC) is wrong, as examples of possible ways that an error is identified. The incoming stream of samples is interpreted according to fixed rules regardless of the clock frequency, thus resulting in incorrect results when the clock frequency is incorrect.

The invention applies to nodes that are receive only, as well as to nodes that additionally include transmission capability. A transmit and receive node will in practice not be allowed to send messages (including error messages) if the clock is not properly adjusted.

If following detection of activity on the bus, a frame is received without any error than there was clearly no error, and this is used to update a count of correctly received frames.

If there was some activity on the bus that could not be interpreted as a frame, there was an error and this is used to update a count of error frames. The decoder then needs to wait for silence, before trying to decode starting with the next activity after this period of silence. How to interpret this "silence" depends on the rules (that are executed regardless of the clock frequency) of the protocol. For CAN this would mean for example that 10 bits sampled are identified as recessive, whereas FlexRay waits 11 bits.

In this way, it is possible to count the number of trials and the number of errors and correct received frames.

Figure 4:
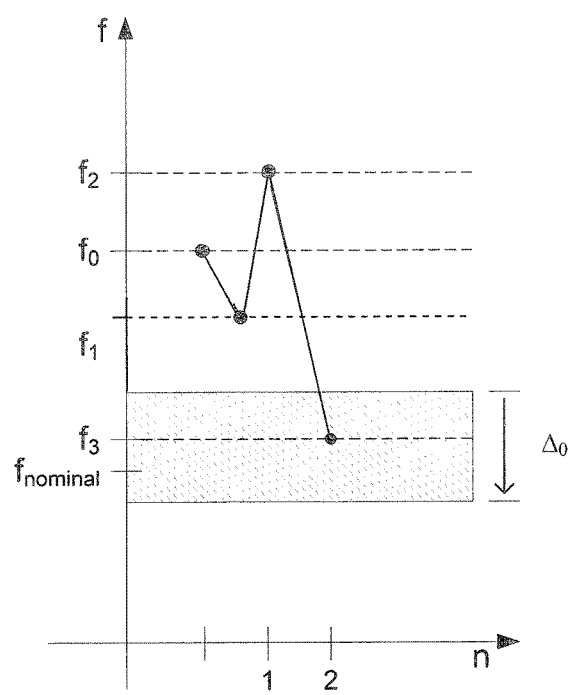
FIG. 4 is used to explain the control method of the invention.

FIG. 4 shows how the frequency of the clock signal is varied when it is determined that frequency adjustment is needed.

The target frequency of the oscillator is denoted as: $f_{nominal}$, and this is centred within a tolerance range $\Delta_0$, which is the difference between the maximum and minimum allowed frequency.

The actual frequency of the oscillator after switching on is denoted as: $f_0$.

In the initial step after switching on the CAN controller receives $m_0$ start-of-frame bits and $e_0$ error frames and $n_0$ correctly received frames ($e_0=m_0-n_0$).

For event triggered protocols such as CAN, a fixed value of m is used for the analysis. A fixed time interval could be used in time-triggered communication systems like FlexRay or TT-CAN.

If $e_0$ is greater than a defined limit, for example 10% of $m_0$, then the oscillator is tuned to the frequency $f_1$. In one example, this is a lower frequency (although it could of course be a higher frequency, without changing the way the invention works), and it is below $f_0$ by an amount less than the tolerance range.

The CAN controller then receives $m_1$ start-of-frame bits which represent initial activity on the bus, and $e_1=m_1-n_1$ error frames. If $e_1$ is greater than a defined limit, again such as 10% of $m_1$, then the oscillator DCO is tuned to the frequency $f_2$ . . . and so on.

The frequencies need to cover a range above and below $f_0$ and with spacing less than the tolerance range. In one example, the new frequencies alternate above and below the initial frequency, with increasing distance from the initial frequency. This implements an iterative frequency search:

$$f_{2n-1}=f_0-(2n-1)\times(\Delta_0-\varepsilon) \text{ with } 0\leq\varepsilon<<\Delta_0.$$

$$f_{2n}=f_0+2n\times(\Delta_0-\varepsilon) \text{ with } 0\leq\varepsilon<<\Delta_0.$$

$(\Delta_0-\varepsilon)$ corresponds to a fixed offset in the register value of the register that is used to trim resistor or capacitor.

With this method, the oscillator finds a reliable frequency close to the desired frequency within the allowed tolerance range. Further methods may be used in order to bring the frequency closer to the target after having found a frequency in the tolerance range, for example by using information about the synchronization jump widths or phase corrections that were applied during frame reception.

Other approaches may be employed, for example stepping down in frequency by an amount corresponding to a maximum expected frequency deviation, and then stepping up in increments.

As mentioned above, the CAN system enables information to be derived from the correctly received frames. If all re-synchronizations where done by lengthening Phase 1 (as shown in FIG. 3), the frequency is too high. If all re-synchronisation steps are implemented by shortening Phase 2, then the frequency is too low.

More generally, if the format of the received message gives some information about clock frequency, this can be used to adapt the way the clock frequency is adjusted, for example giving finer tuning even after messages are being received correctly.

Figure 5:
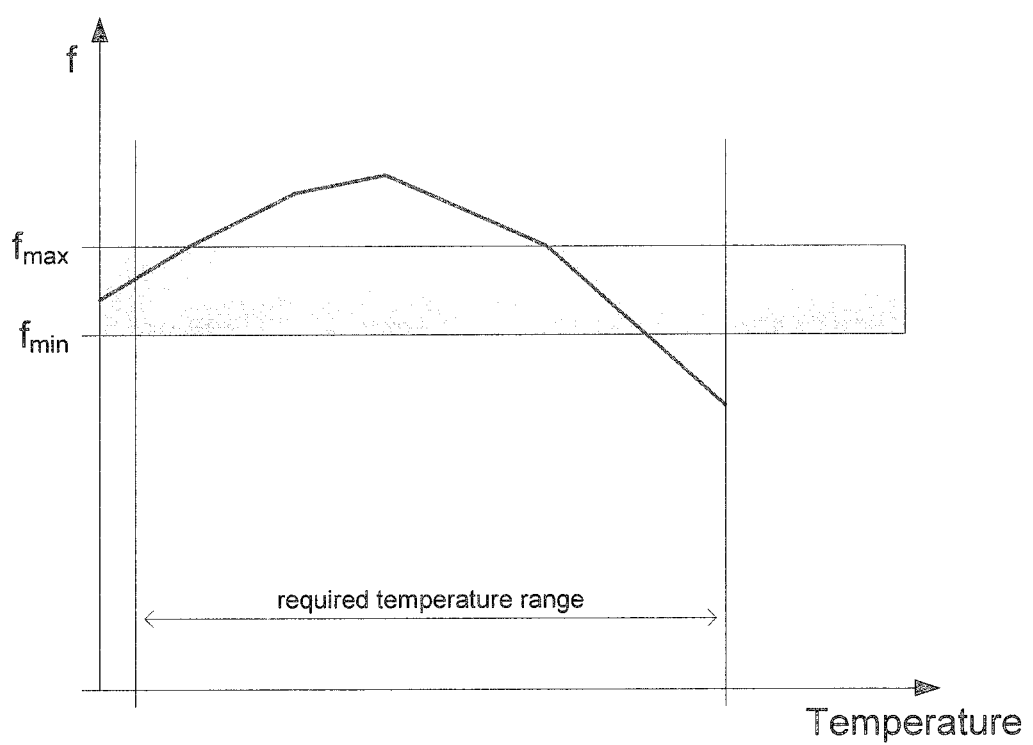
FIG. 5 shows an example of variation of oscillator frequency with temperature.

FIG. 5 shows an example of the drift of an oscillator frequency over temperature.

The average frequency is in the allowed frequency range between $f_{min}$ and $f_{max}$. However, at certain temperatures the frequency leaves the allowed range.

The invention makes use of the digital trimming of the oscillator to provide temperature compensation, based on detection of increased errors. However, the invention is not based on temperature measurement, and can therefore compensate for other causes of clock frequency drift, for example supply voltage variations. Furthermore, the invention can also perform oscillator trimming based on a detected increases in synchronization jump width, or detected phase correction requirements in correctly received frames. In turn, the method can decrease the necessary synchronization jump width or phase correction steps. Thus, any adverse affects to frame reception that occur when the clock frequency has deviated from the desired frequency, and particularly outside the tolerance range, can be compensated.

This invention can be used in a variety of communications devices. Of particular interest is oscillators that are used to clock the digital logic of a protocol controller. As outlined above, one area of interest is in the field of "partial networking"; especially for "CAN" bus systems.

Various modifications will be apparent to those skilled in the art.

The invention claimed is:

1. A communications device, comprising:
a clock circuit configured and arranged to generate a clock signal and including on-chip circuitry that defines a time constant which governs a clock signal frequency of the clock signal, wherein the clock signal frequency is tuneable;
a receiver for receiving messages using the clock signal;
a controller adapted to:
determine an error rate of received messages; and
in response to an error rate exceeding a threshold, vary the clock signal frequency thereby to lower the error rate;
wherein the controller is configured and arranged to iteratively adjust the clock signal frequency by increasing a difference between the clock signal frequency and a starting frequency; and to alternate between setting the clock signal frequency above the starting frequency and setting the clock signal frequency below the starting frequency.

2. The communications device of claim of claim 1, wherein the controller is further configured and arranged to iteratively adjust the clock signal frequency by increasing a difference between the clock signal frequency and a starting frequency in each iteration.

3. The communications device of claim of claim 1, wherein the controller is further configured and arranged to iteratively adjust the clock signal frequency by increasing a difference between the clock signal frequency and a starting frequency in each iteration, and to alternate between setting the clock signal frequency above the starting frequency and setting the clock signal frequency below the starting frequency, the controller setting the clock signal frequency above the starting frequency in even iterations and below the starting frequency in odd iterations.

4. A communications device, comprising:
a clock circuit configured and arranged to generate a clock signal and including on-chip circuitry that defines a time constant which governs a clock signal frequency of the clock signal, wherein the clock signal frequency is tuneable;
a receiver for receiving messages using the clock signal;
a controller adapted to:
determine an error rate of received messages; and
in response to an error rate exceeding a threshold, vary the clock signal frequency thereby to lower the error rate;
wherein the controller is configured and arranged
to iteratively adjust the clock signal frequency by increasing a difference between the clock signal frequency and a starting frequency; and
to, for first and second successive iterations, respectively:
set the clock signal frequency to a first value which varies as a function of odd versus even parity and a fixed offset; and
set the clock signal frequency to a second value which varies as a function of even versus odd parity and the fixed offset.

5. The communications device of claim of claim 4, wherein the controller is further configured and arranged to iteratively adjust the clock signal frequency by increasing a difference between the clock signal frequency and a starting frequency in each iteration.

6. The communications device of claim of claim 4, wherein the controller is further configured and arranged to:
in the first successive iteration (2n−1), set the clock signal frequency to a first value ($f_{2n-1}$), where $f_{2n-1}=f0-(2n-1)*Off$, where Off is the fixed offset; and
in the second successive iteration (2n), set the clock signal frequency to a second value ($f_{2n}$), where $f_{2n}=f0+(2n)*Off$.

7. A device comprising:
an RC circuit that includes a resistor and a capacitor, wherein at least one of the resistor and the capacitor is tuneable in response to a control signal;
an oscillator circuit configured to generate a clock signal having a clock frequency set by an RC time constant of the RC circuit;
a receiver circuit configured to receive messages using the clock signal; and
a controller circuit configured to
resynchronize mismatches between the clock frequency and frequencies for the received messages by changing a length of a phase of the messages; and
change the control signal in response to a change in the length of the phase of the received messages.

8. The device of claim 7, wherein the controller circuit is further configured to generate the control signal to increase the RC time constant in response to the length of the phase of the messages increasing.

9. The device of claim 7, wherein the controller circuit is further configured to generate the control signal to decrease the RC time constant in response to the length of the phase of the messages decreasing.

10. The device of claim 7, wherein the receiver circuit is configured to oversample the received messages.

11. The device of claim 7, wherein the receiver circuit is configured to receive messages on a bus; and the controller circuit is configured to detect activity on the bus using samples from the oversampling.

12. The device of claim 7, wherein the controller circuit is configured to detect an error when a communication is detected on the bus and a corresponding message fails to decode.

13. The device of claim 12, wherein the controller circuit is configured to modify the control signal in response to detecting a threshold amount of errors.

14. The device of claim 12, wherein the controller circuit is configured to distinguish between multiple errors by detecting a lack of activity on the bus.

* * * * *